United States Patent
Cook

(10) Patent No.: US 10,592,377 B2
(45) Date of Patent: Mar. 17, 2020

(54) WEBSITE PERFORMANCE TRACKING

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 647 days.

(21) Appl. No.: 14/586,512

(22) Filed: Dec. 30, 2014

(65) Prior Publication Data

US 2015/0309910 A1 Oct. 29, 2015

Related U.S. Application Data

(60) Provisional application No. 61/983,346, filed on Apr. 23, 2014.

(51) Int. Cl.
*G06F 15/173* (2006.01)
*G06F 11/34* (2006.01)
(Continued)

(52) U.S. Cl.
CPC ...... *G06F 11/3409* (2013.01); *G06F 11/3457* (2013.01); *H04L 67/02* (2013.01);
(Continued)

(58) Field of Classification Search
CPC . H04L 12/2618; H04L 12/2634; H04L 43/04; H04L 43/08; H04L 41/5009; H04L 67/22; H04L 12/2621; H04L 12/2623; H04L 12/2626; H04L 12/2628; H04L 41/22; H04L 43/045; H04L 43/06; H04L 43/062; H04L 43/065; H04L 67/36;
(Continued)

(56) References Cited

U.S. PATENT DOCUMENTS 6,381,635 B1 * 4/2002 Hoyer ................ H04L 41/0213
707/999.01
8,102,770 B2 1/2012 Morrill et al.
(Continued)

OTHER PUBLICATIONS

U.S. Appl. No. 14/072,879; Non-Final Rejection dated Aug. 13, 2015; 37 pages.
(Continued)

*Primary Examiner* — Liang Che A Wang
*Assistant Examiner* — Johnny B Aguiar

(57) ABSTRACT

Novel tools and techniques are provided for tracking website performance and providing a user with website performance data. Embodiments include systems, methods and apparatus for identifying that the user has accessed a website from a user device, obtaining one or more website performance metrics and forwarding one or more website performance metrics to a performance information generator associated with a website performance tracking server. A performance information message is then created by the performance information generator and the performance information message is transmitted to the user device. The performance information message may be displayed to the user on the user device. In selected embodiments, the performance information message is displayed to the user in real-time as the user accesses the website.

17 Claims, 7 Drawing Sheets

(51) Int. Cl.
*H04L 29/08* (2006.01)
*H04L 12/26* (2006.01)

(52) U.S. Cl.
CPC ........ *H04L 67/22* (2013.01); *G06F 2201/805* (2013.01); *H04L 43/04* (2013.01); *H04L 43/045* (2013.01); *H04L 43/06* (2013.01); *H04L 43/065* (2013.01); *H04L 67/36* (2013.01)

(58) Field of Classification Search
CPC ...... H04L 67/02; H04W 24/06; H04W 24/08; G06F 11/3409; G06F 11/3457; G06F 11/3466; G06F 11/3495; G06F 2201/865; G06F 2201/875; G06F 11/3438; G06F 2201/805
USPC .............. 709/202, 203, 217, 219, 223, 224; 370/252
See application file for complete search history.

(56) References Cited

U.S. PATENT DOCUMENTS

| | | | |
|---|---|---|---|
| 8,208,385 B1 | 6/2012 | Hansen et al. | |
| 8,532,074 B2 | 9/2013 | Navda et al. | |
| 9,087,035 B1* | 7/2015 | Bandaru | G06F 17/248 |
| 9,274,935 B1* | 3/2016 | Lachwani | G06F 11/3688 |
| 2002/0129161 A1 | 9/2002 | Lloyd et al. | |
| 2003/0053420 A1* | 3/2003 | Duckett | G06F 11/3495 370/252 |
| 2004/0107296 A1* | 6/2004 | Donker | G06F 17/30902 709/245 |
| 2004/0176992 A1* | 9/2004 | Santos | G06Q 10/0639 705/7.33 |
| 2004/0177138 A1* | 9/2004 | Salle | H04L 29/06 709/223 |
| 2004/0267691 A1* | 12/2004 | Vasudeva | G06F 11/3409 |
| 2005/0097088 A1* | 5/2005 | Bennett | G06F 17/30899 |
| 2005/0262240 A1* | 11/2005 | Drees | G06F 11/3476 709/224 |
| 2005/0270982 A1 | 12/2005 | McBeath | |
| 2006/0085420 A1* | 4/2006 | Hwang | G06F 11/3419 |
| 2006/0106665 A1* | 5/2006 | Kumar | G06Q 10/06393 705/7.29 |
| 2006/0217930 A1* | 9/2006 | Chang | G06F 11/3414 702/186 |
| 2008/0049645 A1 | 2/2008 | Singh | |
| 2009/0028062 A1 | 1/2009 | Meloche | |
| 2009/0138769 A1 | 5/2009 | Lutz et al. | |
| 2009/0310485 A1 | 12/2009 | Averi et al. | |
| 2009/0327353 A1* | 12/2009 | Zhuge | G06F 11/3419 |
| 2010/0192128 A1 | 7/2010 | Schloegel et al. | |
| 2010/0306333 A1* | 12/2010 | Patrawala | G06Q 30/018 709/207 |
| 2011/0131321 A1 | 6/2011 | Black et al. | |
| 2012/0047251 A1* | 2/2012 | Baumback | G06F 11/3409 709/224 |
| 2012/0131466 A1 | 5/2012 | Bugenhagen | |
| 2013/0297338 A1* | 11/2013 | Urmann | G06Q 30/018 705/2 |
| 2014/0280904 A1 | 9/2014 | Bugenhagen | |
| 2015/0019713 A1 | 1/2015 | Bugenhagen | |
| 2015/0333985 A1* | 11/2015 | Offer | H04L 43/028 709/224 |

OTHER PUBLICATIONS

U.S. Appl. No. 14/072,879; Final Rejection dated Feb. 26, 2016; 45 pages.
U.S. Appl. No. 14/072,879; Notice of Allowance dated Oct. 7, 2016; 76 pages.

* cited by examiner

Fig. 5

502
- Congestion _____ 504
- Processing _____ 506
- Size _____ 508
- Delay _____ 510

514
Performance Data Website A:
- A. _____
- B. _____
- C. _____

Traffic Correlation: _____

Performance Data Website B:
- A. _____
- B. _____
- C. _____

Traffic Correlation: _____

516 — 518 User Assessment of Website Performance [slow] [med.] [fast]

520 — 522 Visibility Toggle

524 — 526 Detailed/Simplified

528 Alternative Website Recommendations:
- A. _____
- B. _____
- C. _____

Device Performance Parameters:
- A. _____
- B. _____
- C. _____

512

WEBSITE PERFORMANCE TRACKING

CROSS-REFERENCES TO RELATED APPLICATIONS

This application claims priority to U.S. Patent Application Ser. No. 61/983,346, filed Apr. 23, 2014 by Charles I. Cook, entitled, "Website Performance Tracking." The entire disclosure of this application is incorporated herein by reference in its entirety for all purposes.

This application is related to and co-owned with U.S. Patent Application Ser. No. 61/846,439, filed Jul. 15, 2013 by Michael K. Bugenhagen; U.S. Patent Application Ser. Nos. 61/870,395, filed Aug. 27, 2013 by Michael K. Bugenhagen; and U.S. patent application Ser. No. 14/072,879, filed Nov. 6, 2013 by Michael K. Bugenhagen, each of which applications are entitled "Control Groups for Network Testing." The entire disclosure of each of these applications is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for website performance tracking.

BACKGROUND

Websites have grown considerably more complex since the early days of the Internet. Substantial processing power is required to present and view modern websites, in particular websites which are relatively poorly designed. Many websites have numerous embedded applications. Furthermore, in certain cases, the user's equipment itself may be performance limiting with respect to accessing particular content, for example high-definition video content. In other situations, Internet/website access performance could be limited because too many applications are being run simultaneously on a user's device, or the CPU may be a relatively older and slower model. Often, a user viewing a poorly designed or overly complex webpage or using dated equipment to access modern content will experience poor performance, which may then be incorrectly blamed by the user on an Internet service provider or generically blamed on "the network."

Mistaken diagnoses by a user of poor "network" performance can, in some cases cause unnecessary work for an Internet service provider (ISP). For example, technicians may be called out to the customer premises and/or service locations at which the ISP's network equipment might be located, in order to monitor and diagnose problems believed to be with network connectivity or network performance which are actually the result of relatively poor website performance or relatively poor user device performance.

Hence, there is a need for robust website performance tracking solutions and means for conveying this information to end-users and website owners.

BRIEF SUMMARY

Various embodiments provide techniques for tracking website performance and conveying website performance information to end-users, website owners or other parties.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method of providing a user with website performance data is disclosed. The method includes identifying, with a website performance tracking server, that the user has accessed a website from a user device. The user device may be any type of device, for example a smartphone, tablet, game console, television set-top box, desktop computer, laptop computer or other device which may be connected to a network including but not limited to the Internet and used to access any one of millions of available websites. The method further comprises obtaining with the website performance tracking server one or more website performance metrics. The website performance metrics can be quantitative performance measurements and similar data or subjective assessments of website performance. For example, website performance metrics can include, but are not limited to, website size, the quantity of embedded applications in the website, the processing power required to process the embedded applications, the average or contemporaneous load of the website connection to a network, an average or contemporaneous delay associated with the website connection to a network and a specific or average user assessment of website performance.

This aspect further includes forwarding one or more website performance metrics to a performance information generator associated with the website performance tracking server. A performance information message is then created by the performance information generator and the performance information message is transmitted to the user device. The performance information message is then displayed to the user on the user device. In selected embodiments, the performance information message is displayed to the user in real time as the user accesses the website. In certain embodiments, the performance information could comprise a dashboard showing performance information, and/or data concerning similar sites or alternative sites as described in detail below. In some embodiments, performance information concerning the user's own device may be included in the performance information message.

The step of identifying an accessed website may be accomplished with a deep packet inspection engine running on or in association with the website performance tracking server. The website performance tracking server may have other functional modules which facilitate the creation, processing, storage or retrieval of website performance metrics. For example, a website performance tracking server may include a browser emulator providing for the replication of the access website and the execution of selected performance tests on the replicated website to determine one or more website performance metrics.

In addition, a website performance tracking server may include or be associated with a database or other storage providing for the storage of historical website performance metrics or historical website performance information. Thus, selected method embodiments may include the steps of storing website performance metrics to a database of website performance metrics. The method may also include retrieving website performance metrics from a database prior to the generation of a website performance message. In certain embodiments, the method will include verifying that stored website performance metrics retrieved from a database have been compiled or stored within a select period of time before the data is retrieved and used to generate a website performance message to assure that any retrieved website performance metrics are within a defined range of current information.

In some embodiments, the website performance metrics may include website traffic data obtained with a traffic measurement engine running on or associated with the website performance tracking server. Thus, the website performance information message may include website performance data correlated with contemporaneously obtained website traffic data.

In certain embodiments, the method may include obtaining one or more website performance metrics from a website user. For example, a user may be provided with a user interface on the user device which accepts input comprising a user assessment of website performance. User generated data may be stored in a database associated with the website performance tracking server and subsequently used to generate performance information messages.

The performance information message provided to the user may be provided in any suitable form, including but not limited to audio, visual, audiovisual, text, email, SMS or graphical information. The performance information message may be presented on any type of user device which has network connectivity and which is suitable for accessing a website. In certain embodiments, the performance information message may be a pop-up message of greater or lesser complexity. In some embodiments the pop-up message may include a simplified or graphical representation of website performance which can in certain embodiments be presented as the user accesses a website. In other embodiments the pop-up message may be more sophisticated with relatively detailed performance statistical information or graphical information. A more detailed pop-up message may also, in certain embodiments, be presented in real time as the user accesses a website. The performance information message may be a graphical user interface which accepts input from the user concerning various matters including but not limited to a user assessment of website performance, user preferences concerning message display complexity, message display location or other parameters.

In yet another aspect, an apparatus might be provided. The apparatus might comprise a non-transitory computer readable medium having encoded thereon a set of instructions that, when executed by one or more computers, causes the apparatus to perform a method of tracking website performance and providing a user with website performance data as described above.

In still another aspect, a website performance tracking server might be provided. The website performance tracking server might comprise or be associated with various functional modules including but not limited to a deep packet inspection engine, a browser emulator, a traffic measurement engine, a performance information generator, and input and output connections to one or more networks and one or more databases. Website performance tracking server embodiments may also include one or more processors and a non-transitory computer readable medium in communication with the one or more processors. The computer readable medium might have encoded thereon a set of instructions that, when executed by the one or more processors, causes the website performance tracking server to perform one or more operations for website performance tracking and performance reporting as described herein.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 5 is a schematic diagram illustrating two examples of pop-up style performance information messages.

DETAILED DESCRIPTION OF CERTAIN EMBODIMENTS

Figure 1:
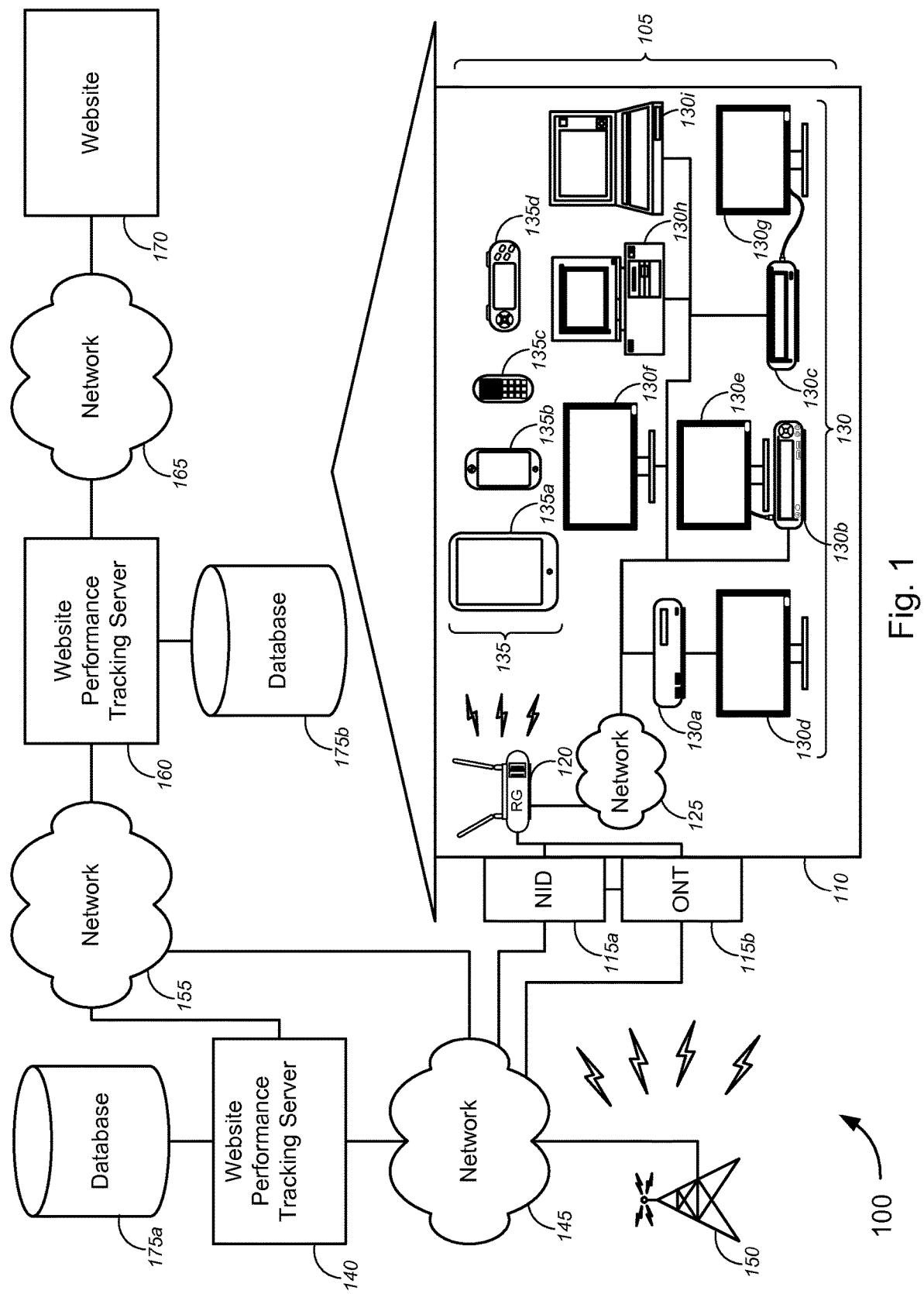
FIG. 1 is a general schematic diagram illustrating a system for tracking website performance, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one disclosed embodiment, a method of providing a user with website performance data is disclosed. As used herein, a website is any type of content site available to a user over the World Wide Web or Internet where the user may access content. The accessed content may be of greater or lesser complexity. Communication between the user and website may be predominantly one-way communication (i.e. the user downloads content from the site) or predominantly two-way (i.e. the user uploads and downloads content to and from the site). The website may be open to the public or open to only a limited subset of the public through passwords, encryption or by other means.

The method includes identifying, with a website performance tracking server, that the user has accessed a website from a user device. The user device may be any type of device, for example a smartphone, tablet, game console, television set-top box, desktop computer, laptop computer or other device which may be connected to a network including but not limited to the Internet and used to access any one of millions of available websites. The method further comprises obtaining with the website performance tracking server one or more website performance metrics. The website performance metrics can be quantitative performance measurements and similar data or subjective assessments of website performance. For example, website performance metrics can include, but are not limited to, website size, the quantity of embedded applications in the website, the processing power required to process the embedded applications, the average or contemporaneous load of the website connection to a network, an average or contemporaneous delay associated with the website connection to a network and a specific or average user assessment of website performance. In certain embodiments, the website performance metrics may include ancillary information or related data, for example, as detailed below, information concerning the users own device performance, information concerning the performance of similar websites and/or suggestions for alternative websites having similar content but better performance.

This aspect further includes forwarding one or more website performance metrics to a performance information generator associated with the website performance tracking server. A performance information message is then created by the performance information generator and the performance information message is transmitted to the user device. The performance information message is then displayed to the user on the user device. In selected embodiments, the performance information message is displayed to the user in real time as the user accesses the website.

We now turn to the embodiments as illustrated by the drawings. FIGS. 1-7 illustrate some of the features of the methods, systems, and apparatus for website performance tracking, as referred to above. The methods, systems, and apparatus illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a general schematic diagram illustrating a system 100 for website performance tracking, in accordance with various embodiments. In FIG. 1, system 100 might comprise one or more sets of customer or user premises equipment ("CPE") 105 located in or at customer or user premises 110. The one or more CPE 105 might comprise a network interface device ("NID") 115a, an optical network terminal ("ONT") 115b, a modem or residential gateway ("RG") 120, and/or one or more user devices 130. The one or more user devices 130 might comprise gaming console 130a, digital video recording and playback device ("DVR") 130b, set-top or set-back box ("STB") 130c, one or more television sets ("TVs") 130d-130g, desktop computer 130h, laptop computer 130i, and/or one or more mobile user devices 135. The one or more TVs 130d-130g might include any combination of a high-definition ("HD") television, an Internet Protocol television ("IPTV"), and/or a cable television, or the like, where one or both of HDTV and IPTV (if present in system 100) may be interactive TVs. The one or more mobile user devices 135 might comprise one or more tablet computers 135a, one or more smart phones 135b, one or more mobile phones 135c, and/or one or more portable gaming devices 135d, or the like. The RG 120 and the one or more user devices 130 might communicatively couple to each other, via either wired or wireless connection, to establish a user local area network ("LAN") 125 within customer premises 110. As described in detail below one or more of the user devices 135 may be used by a user to access websites across various networks using web browsers according to well-known technologies.

System 100 might further comprise a first website performance server 140 communicatively coupled to one or more CPEs 105 via network 145 (which might include, but is not limited to, an access network, a service provider network, a wide area network ("WAN"), or other suitable network, and the like), and in some cases via one or more telecommunications relay systems 150. The one or more telecommunications relay systems 150 might include, without limitation, one or more wireless network interfaces (e.g., wireless modems, wireless access points, and the like, one or more towers, one or more satellites, and the like). System 100 might further comprise network 155 (which might include, but is not limited to, a wide area network ("WAN"), the Internet, or other suitable network, and the like) and alternative website performance tracking server 160 communicatively coupled to network 155. In some instances, system 100 might also comprise network 165 (which might include, without limitation, a service provider network associated with a website 170 or other suitable network, and the like). The system also includes at least one website 170 (representative of the millions of websites accessible across the Internet or other networks) communicatively coupled to networks 165, 155 and 145.

System 100 might further comprise one or more databases 175. The one or more databases 175 might include a database 175a local to the website performance tracking server 140, a database 175b local to website performance tracking server 160, and/or other databases not shown. In some embodiments, website performance tracking server 140, with database 175a communicatively coupled thereto, might be communicatively coupled directly to only network 145, and indirectly to network 155 via network 145. In other instances, website performance tracking server 140 might be communicatively coupled directly to both networks 145 and 155.

Figure 2:
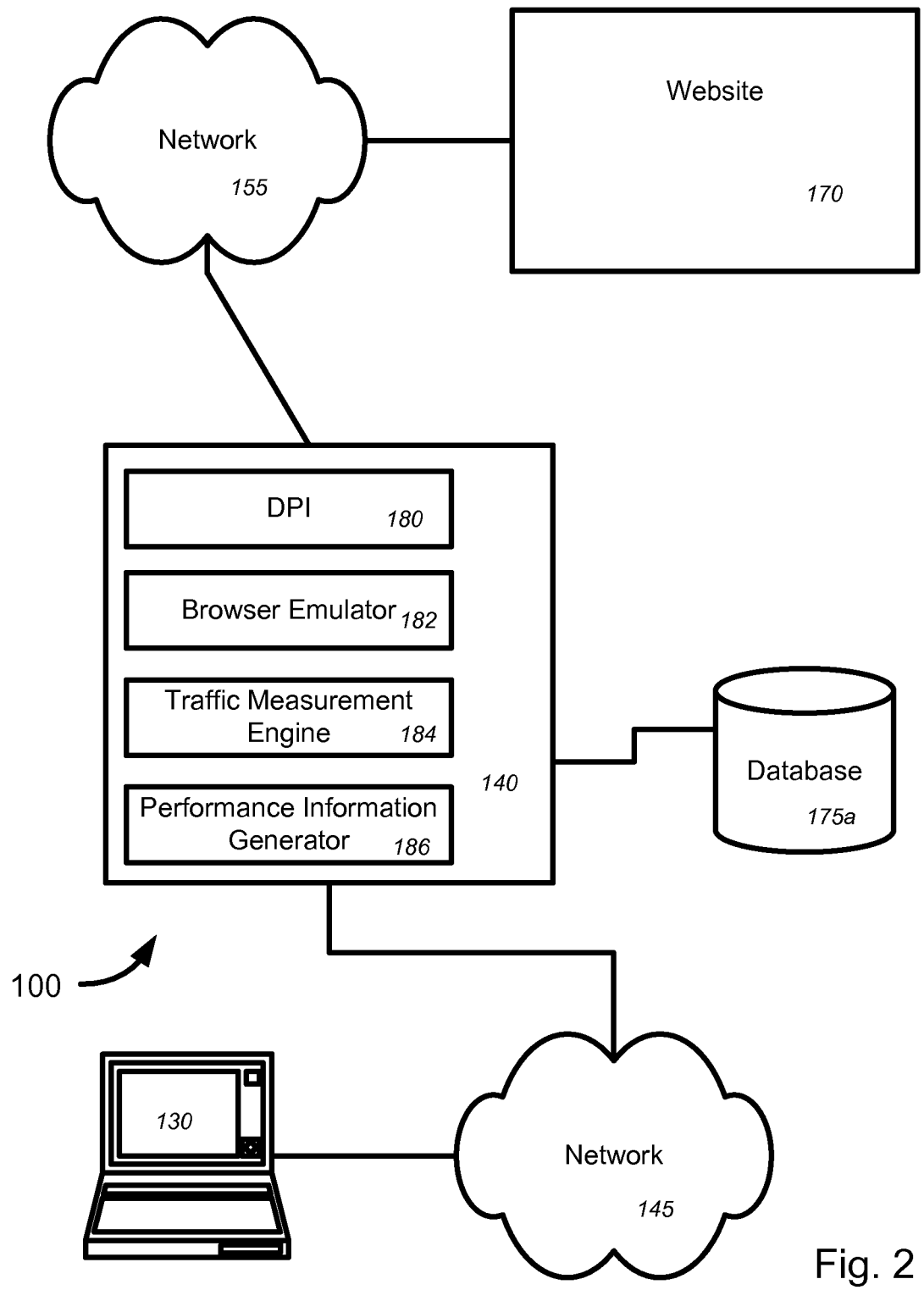
FIG. 2 is a block diagram illustrating a system for tracking website performance, in accordance with various embodiments.

In some embodiments, as illustrated on FIG. 2, a website performance tracking server, for example website performance tracking server 140 or website performance tracking server 160 may include various functional modules. In particular, as shown on FIG. 2, a website performance tracking server may include a deep packet inspection engine 180, a website browser emulator 182 a traffic measurement engine 184 and a performance information generator 186. In addition, it website performance tracking server will include various network connections, for example the illustrated connections to networks 155 and 145. The purpose and functioning of the foregoing functional modules is described in detail below.

It is important to note that the above functional modules, including but not limited to deep packet inspection engine 180, website browser emulator 182, traffic measurement engine 184 and performance information generator 186 are not required to be hardware-based modules associated with a web site performance tracking server as illustrated in FIG. 1. In alternative embodiments, the deep packet inspection engine 180, website browser emulator 182, traffic measurement engine 184 and performance information generator 186 could be distributed across multiple servers or hardware based devices or implemented through a cloud service provided to a user. In summary, although the functional modules 180 to 186 are illustrated as being hardware modules associated with a server 140, these functional modules could be implemented as physical or virtual devices and/or distributed across one or more networks.

In certain embodiments, the website performance tracking server 140 will be maintained by an Internet service provider (ISP) providing Internet service to the user who owns the user device 130 utilized to access the website. In other embodiments, the website performance tracking server 140 will be owned by another party, for example the network service provider providing service to the owner of the website 170.

Figure 3:
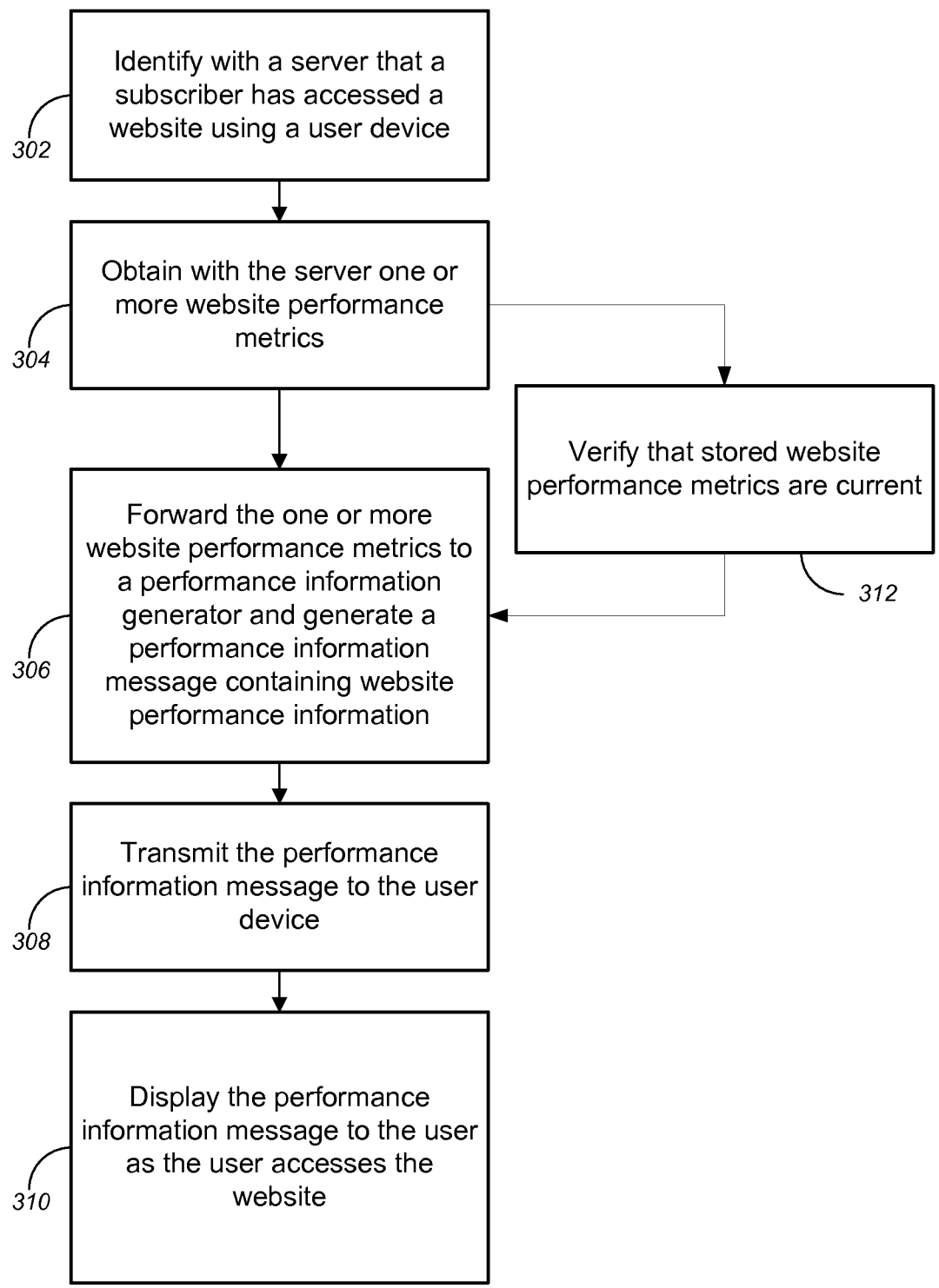
FIG. 3 is a flow diagram illustrating a method for tracking website performance, in accordance with various embodiments.
Figure 4:
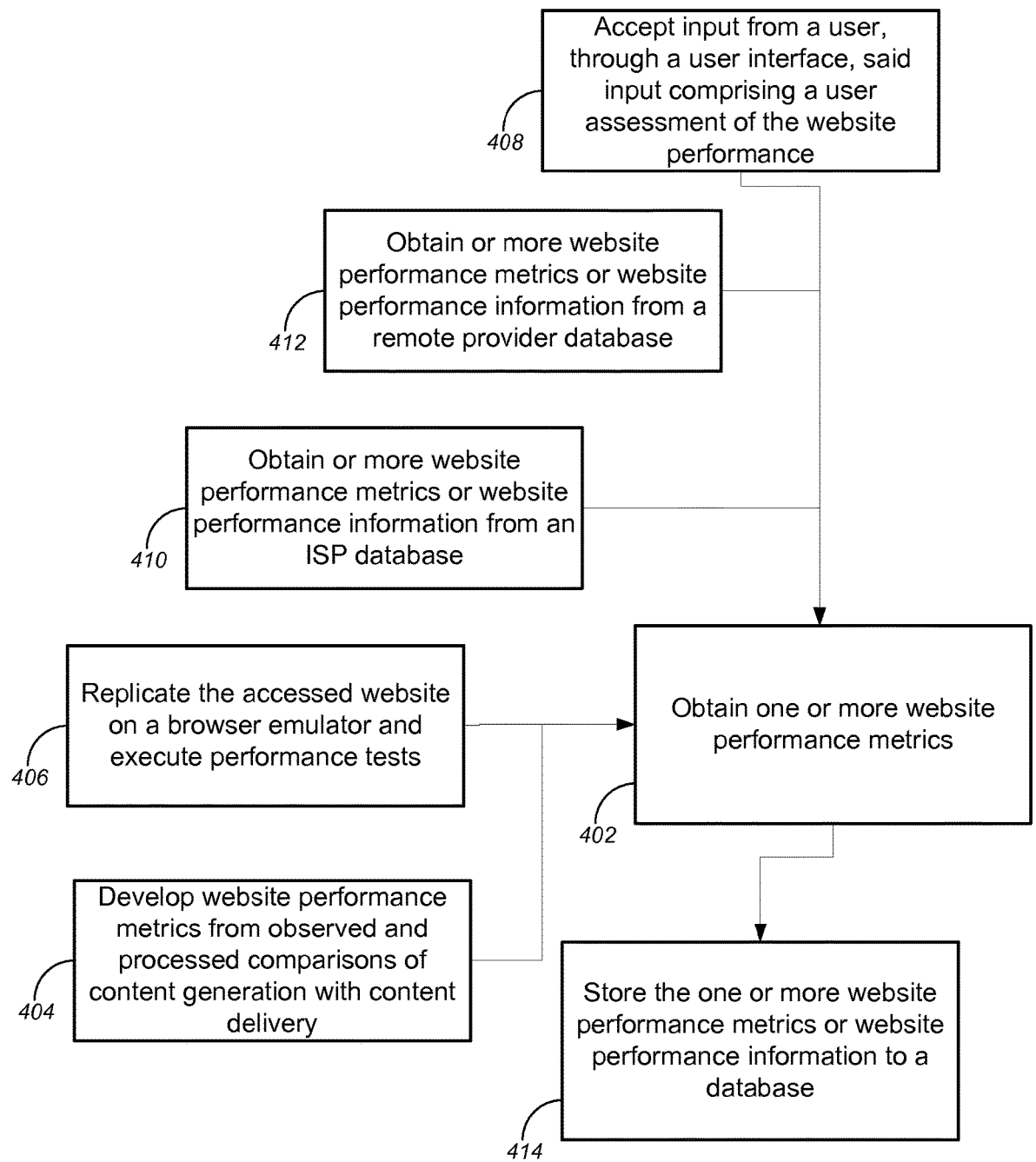
FIG. 4 is a flow diagram illustrating various methods of obtaining website performance metrics.

In operation, the deep packet inspection engine 180 associated with a website performance tracking server (for example server 140) identifies that a user has accessed website 170 on a user device 130 (see FIG. 3 step 302). The deep packet inspection engine 180 operates according to known deep packet inspection principles.

As described in more detail below, when the deep packet inspection engine 180 identifies that a website has been accessed, the browser emulator 182, traffic measurement engine 184 or other tools are utilized to develop or measure one or more website performance metrics. Alternatively stored website performance metrics for the accessed webpage are retrieved from storage 175 (step 304). The terms "website performance metrics" as used herein referred to any quantification or subjective indication of website performance, including but not limited to the following; website size, the quantity of embedded applications in the website, the processing power required to process the embedded applications, the average load of the website connection to a network, the average delay associated with the website connection to a network and an average or specific user assessment of website performance. In certain embodiments, the website performance metrics may include ancillary information or data, for example, as detailed below, suggestions for alternative websites having similar content but better performance or data concerning the performance of the user's own device.

Some or all of the website performance metrics are forwarded to a performance information generator 186 associated with the website performance tracking server 140. The performance information generator generates a performance information message containing website performance information (step 306). As described in detail below, the performance information message is transmitted over one or more networks to the user device 130 and displayed on the user device 130. In certain embodiments the performance information message is transmitted and displayed to the user in real-time as the user accesses the website (steps 308-310).

As noted above, the website performance metrics or website performance information which is derived from the website performance metrics and which is ultimately presented to a user is obtained at the website performance tracking server 140 or website performance tracking server 160. Website performance metrics may be obtained from various sources or combinations of sources (see FIG. 4, step 402). As illustrated on FIG. 4, website performance metrics may, in certain instances, be directly generated. Alternatively, website performance metrics may be obtained from stored historical data.

One example of a class of directly generated website performance metrics involves the monitoring of website and network performance under various conditions. In particular, a network service provider may utilize one or more deep packet inspection engines 180, (or other deep packet inspection functionality which may be hardware based or cloud-based functionality) to determine when a user has accessed a website 170. A traffic measurement engine 184 or similar functional module may be used to monitor traffic between the user and the website as the traffic traverses various paths across one or more networks. Based upon the network traffic being monitored, a history of the performance of the website during content generation and delivery can be developed. The website performance tracking server 140 may correlate the performance of content generation at a website with delivery through specific content servers and routes through the network. The history so developed may be processed to derive both a representation of the load on the network routes utilized, and a representation of the load on the website content servers (step 404).

For example, if monitored traffic from a particular website on a network link having considerable excess capacity shows minimal delay when a first amount of traffic is generated but is observed to have considerable delay when a second, different amount of traffic is monitored (even though there is still excess capacity on the link), then it can be inferred that the website is becoming overloaded and contributing to degraded performance. This information, which is detected based upon network traffic monitoring, may be provided to the performance information generator 184 or stored as described herein.

As noted above, website performance metrics may in certain instances be correlated with other network performance assessments. For example, the processing of website performance metrics and presentation of website performance information to a user as described herein may be facilitated by or correlated with network testing information occurring at any point across one or more networks between a user and website. Certain relevant network testing methods, apparatus, systems and techniques are disclosed in U.S. Patent Application Ser. No. 61/846,439, filed Jul. 15, 2013 by Michael K. Bugenhagen; U.S. Patent Application Ser. Nos. 61/870,395, filed Aug. 27, 2013 by Michael K. Bugenhagen; and U.S. patent application Ser. No. 14/072,879, filed Nov. 6, 2013 by Michael K. Bugenhagen, each of which applications are entitled "Control Groups for Network Testing." The entire disclosure of each of these applications is incorporated herein by reference in its entirety for all purposes.

Alternatively, website performance metrics may be directly generated by replicating the accessed website on a browser emulator 182 associated with a website performance tracking server 140 or 160. As the various functions and applications provided by or embedded within the website are run on the browser emulator 182, selected performance tests may be executed at the browser emulator 182 to directly measure selected website performance metrics (step 406).

Website performance metrics may also be subjectively generated by a user based upon the user's personal assessment of website performance (step 408). Website performance metrics as determined by user may be uploaded through a graphical user interface (GUI) associated with the performance information message described above. Additional detail concerning selected GUI interfaces is set forth below. The subjectively generated user assessments of website performance can be transmitted to a website performance tracking server 140 or 160, stored and retrieved from memory as described herein to support subsequent requests for website performance information.

Alternatively, historical website performance metrics may be retrieved from a database. Representative databases which may store website performance information include but are not limited to databases 175a and 175b of FIG. 1. Database 175a is associated with website performance tracking server 140 and maintained by the ISP providing service to the user premises 110. Database 175b is associated with a content provider network or other network. Selected website performance metrics may be retrieved from a database and forwarded to the performance information generation module 184 of a website performance tracking server (steps 410 and 412). In addition website performance metrics derived from any source may be stored to database 175 (step 414).

In certain embodiments, where historical website performance metrics are retrieved from the database 175, it may be desired to verify that the compiled and stored website performance metrics have been compiled, stored or generated within a selected period of time before the website performance metrics are being retrieved (step 312). Verification that stored website performance metrics are current is advisable in view of the dynamic nature of various networks and further in view of the likelihood that in many instances websites are being modernized or upgraded a relatively frequent basis.

In some embodiments, historical website performance metrics may also include website performance data for websites providing similar content. As described in detail below, this ancillary type of website performance metric may be utilized to provide suggestions to a user experiencing poor website performance while attempting to access a website, retrieve content from a website or upload content to a website.

As noted above, a performance information message may be generated at the website performance tracking server 140, 160 and transmitted to a user device. In certain embodiments, the performance information message is transmitted to the user and displayed on the user device in real-time as the website is being viewed. The performance information message may be any type of digitally transmitted message that may be displayed on a user device. For example, the performance information message maybe an audio or audiovisual display. The performance information message may be an email, text or short message service (SMS) message. In one embodiment, the performance information message is a pop-up message of greater or lesser complexity which is displayed alongside or over a small portion of the website content being displayed on the user's device.

Certain representative pop-up messages are schematically illustrated on FIG. 5. In certain embodiments, the pop-up message or other performance information message will be relatively simple, and preferably small and innocuous to facilitate display of the message while the user is accessing a website. For example representative pop-up message 502 may include one or more small fields containing summarized performance data. Pop-up message 502 includes a short indication of website congestion data 504, the processing power required by the display of the website 506, website size 508 and network delay 510. This configuration is not limiting. Other similar performance data may be presented in the simplified format of pop-up 502. Alternatively, in a highly simplified embodiment, no specific numeric data may be presented. For example a performance data pop-up may be as simple as a red, yellow or green field (or other similar coding) presenting summarized performance information to the user, for example with red corresponding to a "slow" website, yellow corresponding to an intermediately slow website and green corresponding to a relatively high performance website.

Alternatively, the performance information message may be a more sophisticated pop-up, for example pop-up 512. A more sophisticated pop-up may be implemented in a dashboard format to include, for example, a performance data field 514 which includes various performance data presented in greater or lesser detail. The performance data field 514 may, in certain embodiments, include website performance data for multiple webpages being accessed by a user. As noted above, a more sophisticated pop-up 512 may constitute a GUI interface which accepts input from the user. For example, pop-up 512 may include a field 516 for accepting a user's subjective assessment of website performance which is engaged by selecting virtual button 518. Other buttons and fields may be provided to facilitate a quick and accurate input of a user assessment. Any subjective assessment of website performance created by a user may be uploaded to database 175 and utilized to generate website performance metrics for other users who access the same webpage according to the methods disclosed above.

Similarly, a more sophisticated pop-up 512 may include a user option to minimize or turn off performance information or switch between detailed and simplified presentations of performance information. See for example, the performance information visibility toggle field 520 engaged by selecting virtual button 522 and the detailed/simplified presentation toggle 524 engaged by selecting virtual button 526.

The pop-up or dashboard 512 may include a field 528 showing alternative websites to the user offering the same or similar content, but which websites have better performance historically or better performance determined at a particular point in time. As noted above, the performance metrics prepared for alternative websites may be generated as described herein or derived from historical data stored in a database, for example database 175a or 175b.

Other performance information including but not limited to graphs, charts, user assessments, representative icons and the like may be included in alternative performance information messages of greater or lesser complexity. Furthermore, a relatively more sophisticated performance information message may include website performance information correlated with contemporaneous website traffic, if website traffic data has been collected and is being collected with a traffic measurement engine 184 or is available through another source.

As noted above, a poor user experience with a website may, in many instances, be related to poor website performance. Alternatively, a poor user experience may be related to shortcomings with the user's own device. For example, a user utilizing a device having limited processing capabilities, limited graphics processing capacity in particular, or a bandwidth-limited connection to the Internet may experience poor performance when accessing a website which places high demands on the user's equipment. For example, a user streaming video may experience poor performance if the processing capacity of the user's equipment is not sufficient to properly process and display the incoming video data stream.

Therefore, in certain embodiments it may be desirable to include a client application which may be loaded onto the user's device or devices to determine or assess the performance of the device before or as a website is being accessed. The user device can be any type of device capable of accessing a website including but not limited to devices 130 and 135 shown on FIG. 1. The client application may be configured to ascertain whether the user's device 130, 135 is limited by its own processing capacity, device connectivity, or other local issues. The result of the device-based assessment may be presented to the user along with the other performance metrics information, for example in field 530 of dashboard/pop-up 512.

As described above, web site performance information is advantageously provided to a user to help him or her assess website performance and separate website performance issues from network or other performance issues. Website performance information may also, in alternative embodiments, be provided to network service providers, website content providers or others for any diagnostic or development purpose.

Although three sets of networks are shown in FIG. 1, the various embodiments are not so limited, and any suitable number of sets of ISP or content provider networks and corresponding customers (and customer devices and customer networks) may be used, depending upon the number of service providers in any particular region (which could include any sized community including, without limitation, a village, a town, a city, a state or province, a nation, a transnational entity, or the like). The various embodiments allow application of the methods described herein to any suitable number of customers (and customer devices and customer networks) ranging from 1 to N, where N is any appropriate number of customers that any service provider can technically connect to the service provider's network. In some cases, any theoretical maximum limit for N may increase with time as technology advances.

Figure 6:
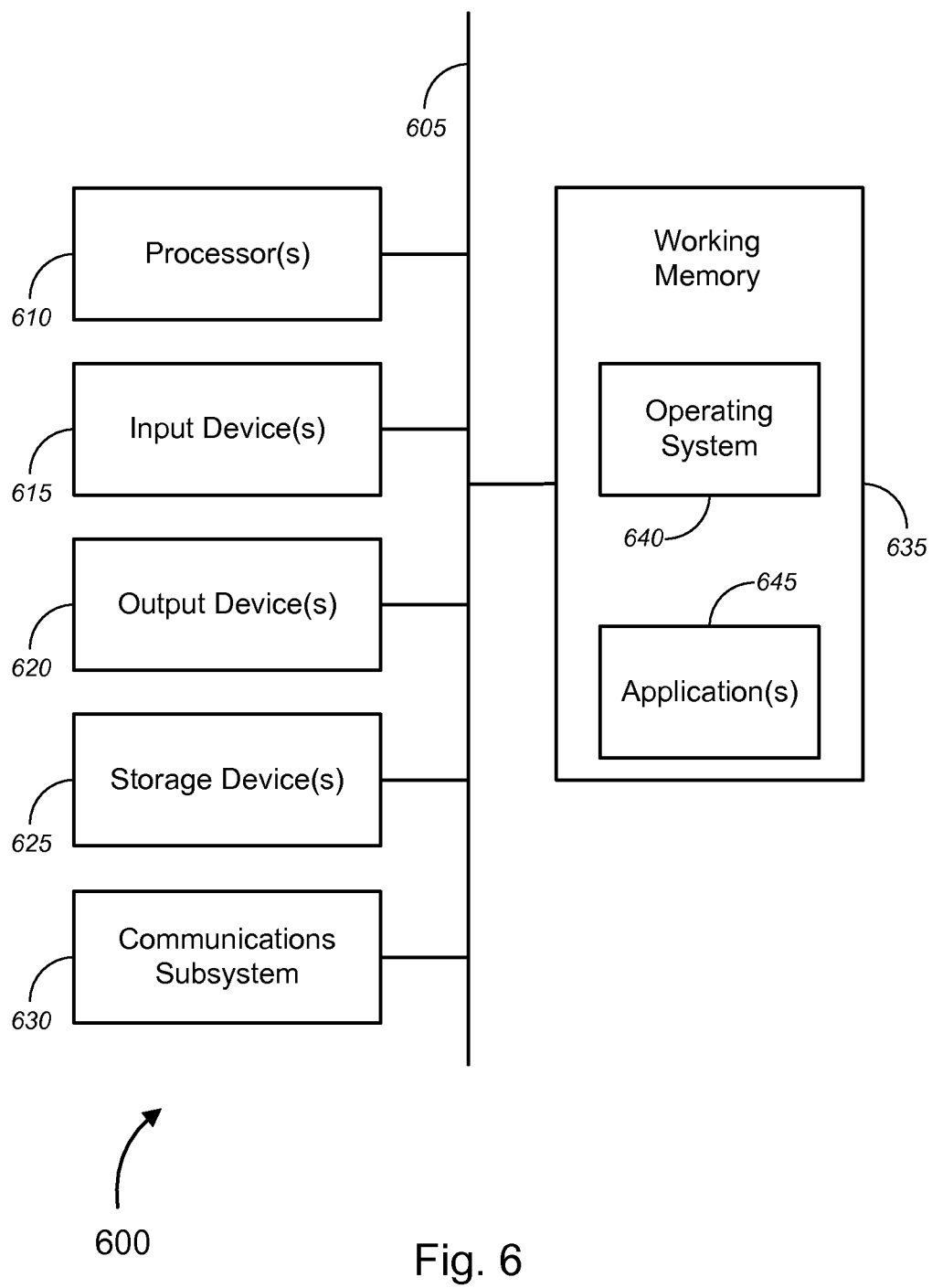
FIG. 6 is a block diagram illustrating an exemplary computer or system hardware architecture, in accordance with various embodiments.

We now turn to FIG. 6, which is a block diagram illustrating an exemplary computer architecture. FIG. 6 provides a schematic illustration of one embodiment of a computer system 600 that can perform the methods provided by various other embodiments, as described herein, and/or can perform the functions of local or user computer system 130, website performance tracking servers 140, 160 or other computer systems as described above. It should be noted that FIG. 6 is meant only to provide a generalized illustration of various components, of which one or more, or none, of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors, or one or more special-purpose processors such as digital signal processing chips, graphics acceleration processors, or the like; one or more input devices 615, which can include without limitation a mouse, a keyboard, or the like; and one or more output devices 620, which can include without limitation a display device, a printer, or the like.

The computer system 600 may further include, or be in communication with, one or more storage devices 625. The one or more storage devices 625 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 600 might also include a communications subsystem 630, which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 630 may permit data to be exchanged with a network (such as network 125, 145 or 155 to name examples), with other computer systems, with any other devices described herein, or with any combination of network, systems, and devices. According to some embodiments, network 125 (as well as network 145, 155 and 165) might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 600 will further comprise a working memory 635, which can include a RAM or ROM device, as described above.

The computer system 600 may also comprise software elements, shown as being currently located within the working memory 635, including an operating system 640, device drivers, executable libraries, or other code. The software elements may include one or more application programs 645, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 625 described above. In some cases, the storage medium might be incorporated within a computer system, such as the system 600. In other embodiments, the storage medium might be separate from a computer system—that is, a removable medium, such as a compact disc, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 600, or might take the form of source or installable code. The source or installable code, upon compilation, installation, or both compilation and installation, on the computer system 600 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 600, to perform methods in accordance with various embodiments of the invention. According to a set of embodiments, some or all of the procedures of such methods might be performed by the computer system 600 in response to processor 610 executing one or more sequences of one or more instructions. The one or more instructions might be incorporated into the operating system 640 or other code that may be contained in the working memory 635, such as an application program 645. Such instructions may be read into the working memory 635 from another computer readable medium, such as one or more of the storage devices 625. Merely by way of example, execution of the sequences of instructions contained in the working memory 635 might cause the one or more processors 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions or code to the one or more processors 610 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630, or the media by which the communications subsystem 630 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

Figure 7:
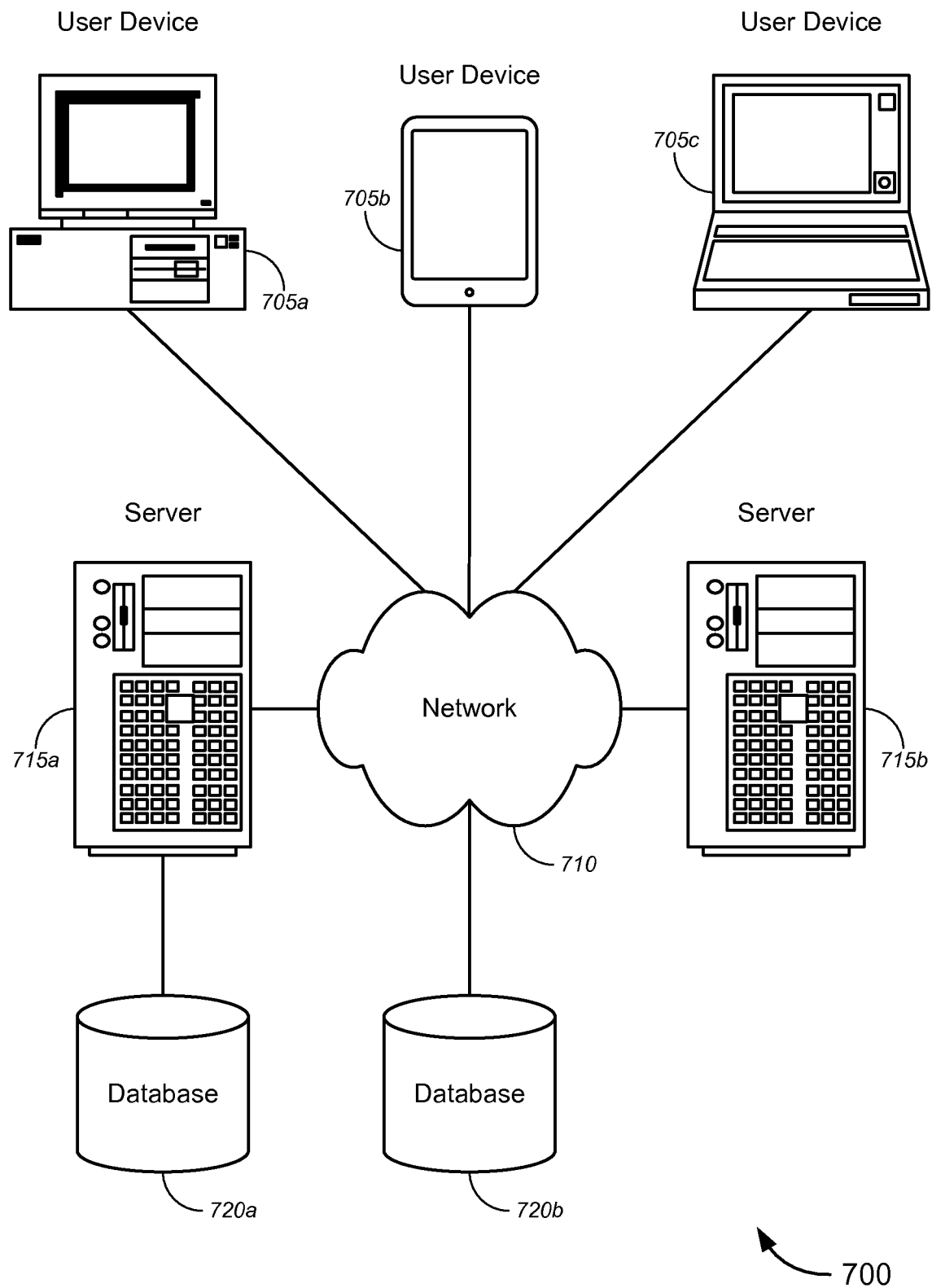
FIG. 7 is a block diagram illustrating a networked system of computers, which can be used in accordance with various embodiments.

As noted above, a set of embodiments comprises methods and systems for website performance tracking. FIG. 7 illustrates a schematic diagram of a system 700 that can be used in accordance with one set of embodiments. The system 700 can include one or more user computers or user devices 705. A user computer or user device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer or user device 705 can also have any of a variety of applications, including one or more applications configured to perform methods provided by various embodiments (as described above, for example), as well as one or more office applications, database client and/or server applications, and/or web browser applications. Alternatively, a user computer or user device 705 can be any other electronic device, such as a thin-client computer, Internet-enabled mobile telephone, and/or personal digital assistant, capable of communicating via a network (e.g., the network 710 described below) and/or of displaying and navigating web pages or other types of electronic documents. Although the exemplary system 700 is shown with three user computers or user devices 705, any number of user computers or user devices can be supported.

Certain embodiments operate in a networked environment, which can include a network 710. The network 710 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 710 can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer or user device 705 and/or another server 715. In some embodiments, an application server can perform one or more of the processes for implementing automated cloud expansion and ordering, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer or user device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer or user device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of providing website performance data comprising:
    identifying, at a server, a first website being accessed by a user device;
    replicating the first website on a browser emulator associated with the server;
    obtaining, with the server, a first set of website performance metrics for the first website;
    executing selected performance tests on the replicated website to determine a first set of determined performance results;
    including the first set of determined performance results in the first set of website performance metrics;
    obtaining, with the server, a second set of website performance metrics for a second website having similar content to the first website;
    forwarding the first set of website performance metrics and the second set of website performance metrics to a performance information generator associated with the server;
    determining, with the server, the second set of website performance metrics demonstrates better performance than the first set of website performance metrics;
    generating a performance information message containing website performance information for the first website and the second website, based upon the first set of website performance metrics and the second set of website performance metrics;
    transmitting the performance information message to the user device;
    determining a user device performance information; and
    simultaneously displaying the performance information message, the user device performance information, and a display recommending the second website as an alternative website having better performance than the first website on the user device, substantially in real-time as the user device accesses the first website.

2. The method of claim 1 further comprising:
    storing the first set of website performance metrics to a website performance metrics database.

3. The method of claim 2 further comprising:
    retrieving the first set of website performance metrics from data storage maintained by one or more of, a provider access network, a content provider network and a content server.

4. The method of claim 3 further comprising:
    providing a user interface on the user device;
    accepting input through the user interface, said input comprising a user website performance assessment; and
    including the user website performance assessment in the first set of website performance metrics.

5. The method of claim 4 further comprising:
    obtaining a first set of website traffic data with a traffic measurement engine associated with the server; and
    including the first set of website traffic data in the first set of website performance metrics.

6. The method of claim 2 further comprising:
    accessing the website performance metrics database to determine whether the first set of website performance metrics have been previously compiled and stored in the website performance metrics database;
    determining when the first set of website performance metrics were stored in the website performance metrics database; and
    rejecting the stored first set of website performance metrics if the stored first set of website performance metrics have not been stored within a selected period of time before identifying the first website.

7. The method of claim 1 wherein the first set of website performance metrics comprise one or more of a website size, a quantity of embedded applications in the website, a required processing power to process the embedded applications, an average load of the website connection to a network, an average delay associated with the website connection to a network; an average user assessment of website performance.

8. The method of claim 1 further comprising:
    accepting input through a user interface on the user device, selectively permitting the display of the performance information message.

9. The method of claim 8 further comprising:
    generating a detailed performance information message containing numerical website performance information based upon the first set of website performance metrics;
    generating a simplified performance information message containing graphic website performance information based upon the first set of website performance metrics;
    transmitting the detailed performance information message and the simplified performance information message to the user device;
    accepting input through the user interface, selecting one of the detailed performance information message and the simplified performance information message for display; and
    displaying the selected performance information message on the user device.

10. An apparatus comprising:
    a non-transitory server readable medium having encoded thereon a set of instructions which, when executed by one or more servers, causes the apparatus to perform one or more operations for providing a user with website performance data, the set of instructions comprising:

instructions for identifying a first website being accessed by a user device;

instructions for replicating the first website on a browser emulator associated with the server;

instructions for obtaining a first set of website performance metrics for the first website;

instructions for executing selected performance tests on the replicated website to determine a first set of determine performance results;

instructions for including the first set of determined performance results in the first set of website performance metrics;

instructions for obtaining, with the server, a second set of website performance metrics for a second website having similar content to the first website;

instructions for forwarding the first set of website performance metrics and the second set of website performance metrics to a performance information generator associated with the server;

instructions for determining, with the server, the second set of website performance metrics shows better performance than the first set of website performance metrics;

instructions for generating a performance information message containing website performance information for the first website and the second website, based upon the first set of website performance metrics and the second set of website performance metrics;

instructions for transmitting the performance information message to the user device;

instructions for determining a user device performance information; and instructions for simultaneously displaying the performance information message, the user device performance information, and a recommendation of the second website as an alternative website having better performance than the first website on the user device, substantially in real-time as the user device accesses the first website.

11. The apparatus of claim 10 wherein the set of instructions further comprises:

instructions for storing the first set of website performance metrics to a website performance metrics database.

12. The apparatus of claim 11, wherein the set of instructions further comprises:

instructions for retrieving the first set of website performance metrics from data storage maintained by one or more of, a provider access network, a content provider network and a content server.

13. The apparatus of claim 12 wherein the set of instructions further comprises:

instructions for providing a user interface on the user device;

instructions for accepting input through the user interface, said input comprising a user website performance assessment; and instructions for including the user website performance assessment in the first set of website performance metrics.

14. The apparatus of claim 13 wherein the set of instructions further comprises:

instructions for obtaining a first set of website traffic data with a traffic measurement engine in communication with the server;

instructions for including the first set of website traffic data in the first set of website performance metrics.

15. The apparatus of claim 11 wherein the set of instructions further comprises:

instructions for accessing the website performance metrics database to determine whether the first set of website performance metrics have been previously compiled and stored in the website performance metrics database;

instructions for determining when the first set of website performance metrics have been compiled and stored in the website performance metrics database;

instructions for rejecting the stored first set of website performance metrics, if the stored first set of website performance metrics have not been stored within a selected period of time before identifying the first website.

16. The apparatus of claim 15 wherein the set of instructions further comprises:

instructions for generating a detailed performance information message containing numerical website performance information based upon the first set of website performance metrics;

instructions for generating a simplified performance information message containing graphic website performance information based upon the first set of website performance metrics;

instructions for transmitting the detailed performance information message and the simplified performance information message to the user device;

instructions for accepting input through the user interface, selecting one of the detailed performance information message and the simplified performance information message for display; and instructions for displaying the selected performance information message on the user device.

17. The apparatus of claim 10 wherein the set of instructions further comprises:

instructions for providing a user interface on the user device; and instructions for accepting input through the user interface selectively causing the display of the performance information message.

* * * * *